United States Patent
Bitincka et al.

(10) Patent No.: US 10,049,160 B2
(45) Date of Patent: Aug. 14, 2018

(54) PROCESSING A SYSTEM SEARCH REQUEST ACROSS DISPARATE DATA COLLECTION SYSTEMS

(71) Applicant: Splunk Inc., San Francisco, CA (US)

(72) Inventors: Ledion Bitincka, Pasadena, CA (US);
Steve Zhang, San Francisco, CA (US);
Igor Stojanovski, San Francisco, CA (US); Stephen Sorkin, San Francisco, CA (US)

(73) Assignee: Splunk Inc., San Francisco, CA (US)

( * ) Notice: Subject to any disclaimer, the term of this patent is extended or adjusted under 35 U.S.C. 154(b) by 0 days.

(21) Appl. No.: 14/266,832

(22) Filed: May 1, 2014

(65) Prior Publication Data
US 2014/0330815 A1 Nov. 6, 2014

Related U.S. Application Data

(63) Continuation of application No. 13/886,737, filed on May 3, 2013, now Pat. No. 8,738,629.

(51) Int. Cl.
*G06F 17/30* (2006.01)

(52) U.S. Cl.
CPC .. *G06F 17/30864* (2013.01); *G06F 17/30477* (2013.01); *G06F 17/30516* (2013.01); *G06F 17/30545* (2013.01); *G06F 17/30979* (2013.01)

(58) Field of Classification Search
USPC .......................... 707/622, 623, 706, 758, 722
See application file for complete search history.

(56) References Cited

U.S. PATENT DOCUMENTS

| 6,446,062 | B1 | 9/2002 | Levine et al. | |
|---|---|---|---|---|
| 2007/0288247 | A1 | 12/2007 | Mackay | |
| 2008/0177994 | A1 | 7/2008 | Mayer | |
| 2008/0281915 | A1* | 11/2008 | Elad ..................... | G06Q 10/10 709/204 |
| 2008/0319943 | A1* | 12/2008 | Fischer ............. | G06F 17/30867 |

(Continued)

OTHER PUBLICATIONS

SQL?MED retrieved from http://wiki.postgresgl.org/wiki/SQL/MED dated Sep. 11, 2013, 10 pages.
(Continued)

*Primary Examiner* — Sana A Al-Hashemi
(74) *Attorney, Agent, or Firm* — Shook, Hardy & Bacon, L.L.P.

(57) ABSTRACT

A search request received at a computer of a search support system is processed by analyzing the received search request to identify request parameters and connecting to a system index of the search support system that is referenced in the request parameters. An external result provider (ERP) process is initiated that establishes communication between the search support system and a data source external to the search support system, for a virtual index referenced in the request parameters. Thus, the ERP process provides an interface between the search support system and external data sources, such as by third parties. The ERP process can operate in a streaming mode (providing real-time search results with minimal processing) and/or a reporting mode (providing results with a greater delay and processing extent) and can switch between modes. The search request results are received from the connected system indexes and the referenced virtual indexes.

30 Claims, 8 Drawing Sheets

(56) References Cited

U.S. PATENT DOCUMENTS

| | | | |
|---|---|---|---|
| 2009/0319672 A1 | 12/2009 | Reisman | |
| 2011/0093471 A1* | 4/2011 | Brockway | G06F 17/30616 707/747 |
| 2011/0209049 A1* | 8/2011 | Ghosh | G06Q 10/06 715/236 |
| 2011/0252016 A1* | 10/2011 | Shacham | G06F 17/30696 707/706 |
| 2011/0289422 A1 | 11/2011 | Spivack et al. | |
| 2012/0059813 A1* | 3/2012 | Sejnoha | G06F 17/30864 707/707 |
| 2012/0059823 A1* | 3/2012 | Barber | G06F 17/30584 707/737 |
| 2012/0191716 A1 | 7/2012 | Omoigui | |
| 2013/0022116 A1 | 1/2013 | Bennett | |
| 2013/0124495 A1 | 5/2013 | Sejnoha et al. | |
| 2013/0239163 A1 | 9/2013 | Kim et al. | |
| 2014/0019405 A1 | 1/2014 | Borthakur et al. | |
| 2014/0025427 A1* | 1/2014 | Bastian | G06O 30/0201 705/7.29 |
| 2014/0137104 A1* | 5/2014 | Nelson | G06F 9/45558 718/1 |
| 2014/0344256 A1 | 11/2014 | Bitincka et al. | |

OTHER PUBLICATIONS

Elghandor et al., "ReStore: Reusing Results of MapReduce Jobs", proceedings of the VLDB Endowment, Vo. 5, No. 6 pp. 586-597, dated 2012.

Non-Final Office Action dated Apr. 7, 2017 in U.S. Appl. No. 14/266,832, 9 pages.

U.S. Appl. No. 13/886,692, filed May 3, 2013, Office Action, dated Feb. 20, 2014.

U.S. Appl. No. 13/886,737, filed May 3, 2013, Office Action, dated Nov. 19, 2013.

U.S. Appl. No. 13/886,737, filed May 3, 2013, Notice of Allowance, dated Jan. 16, 2014.

U.S. Appl. No. 14/449,144, Non-Final Office Action dated Jan. 28, 2015.

U.S. Appl. No. 14/449,144, Final Office Action dated Aug. 24, 2015.

U.S. Appl. No. 14/449,144, Advisory Action dated Nov. 23, 2015.

U.S. Appl. No. 14/449,144, Non-Final Office Action dated Dec. 24, 2015.

U.S. Appl. No. 14/449,144, Notice of Allowance dated Aug. 30, 2016.

Notice of Allowance dated Oct. 26, 2017 in U.S. Appl. No. 15/339,951, 6 pages.

* cited by examiner

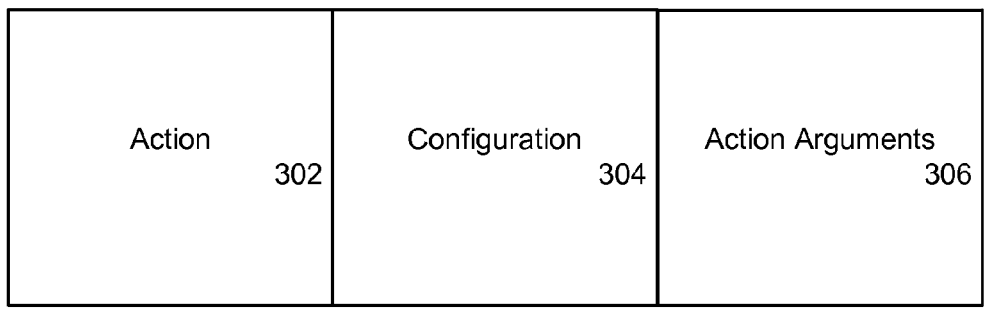
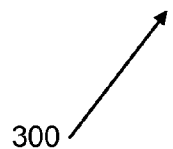
FIG. 3

| Function | ERP Streaming Mode | ERP Reporting Mode |
|---|---|---|
| Communication Channel | Standard In/Out | Standard In/Out |
| ERP Output Type | Raw Data | Processed Data (e.g., statistics, aggregates) |
| Schema Binding (e.g, Event Breaking, Time Stamping) | Done by Search Head | Done by ERP |
| Filtering, Statistics, and Aggregates | Done by Search Head on the Schematized Data Search Head Created From ERP Data | Done by ERP or by external system as directed by ERP |
| Final Result Generation (merging results from ERP with results from other ERPs and local indices) | Done by Search Head (after search head processes ERP results) | Done by Search Head (ERP did the processing, so immediately available for Search Head to Perform Merger) |
| Tradeoffs | Low Latency, Low Bandwidth | Greater Latency, Greater Bandwidth |

FIG. 6

PROCESSING A SYSTEM SEARCH REQUEST ACROSS DISPARATE DATA COLLECTION SYSTEMS

CROSS-REFERENCE TO RELATED APPLICATIONS

This application claims benefit as a Continuation of U.S. application Ser. No. 13/886,737, filed on May 3, 2013, the entire contents of the aforementioned is hereby incorporated by reference as if fully set forth herein, under 35 U.S.C. § 120. The applicant(s) hereby rescind any disclaimer of claim scope in the parent application(s) or the prosecution history thereof and advise the USPTO that the claims in this application may be broader than any claim in the parent application(s).

BACKGROUND

Search support systems typically provide an interface to users for submitting search requests to a database according to a file system maintained by the search support system. The database and file system of the search support system are transparent to the user. Such search requests are efficiently processed over the database, according to the file system, and can be carried out in real time. Different search support systems will typically have proprietary databases and unique file systems. For multiple searches over multiple databases of different search support systems, users must login to each different search support system and submit their search request.

Greater user convenience could be achieved if different databases could be accessed from a single login at a single search support system. Nevertheless, users would prefer not to achieve greater convenience at the expense of delay in the search response time.

SUMMARY

In some aspects, a search request received at a computer of a search support system is processed by analyzing the received search request to identify request parameters and connecting to a system index of the search support system that is referenced in the request parameters. An external result provider (ERP) process is initiated that establishes communication between the search support system and a data source external to the search support system, for a virtual index referenced in the request parameters. Thus, the ERP process provides an interface between the search support system and external data sources, such as by third parties. The ERP process can operate in a streaming mode (providing real-time search results with minimal processing) and/or a reporting mode (providing results with a greater delay and processing extent) and can switch between modes. The search request results are received from the connected system indexes and the referenced virtual indexes.

Other features of the disclosed subject matter will be apparent from the following description of the embodiments, which illustrate, by way of example, the principles of the disclosed subject matter.

BRIEF DESCRIPTION OF THE DRAWINGS

FIG. 3 is a diagrammatic representation of the parameters in a search request processed by the system illustrated in FIG. 1.

FIG. 6 is a representation of operating mode features available in the ERP processes illustrated in FIG. 1.

DETAILED DESCRIPTION

Figure 1:
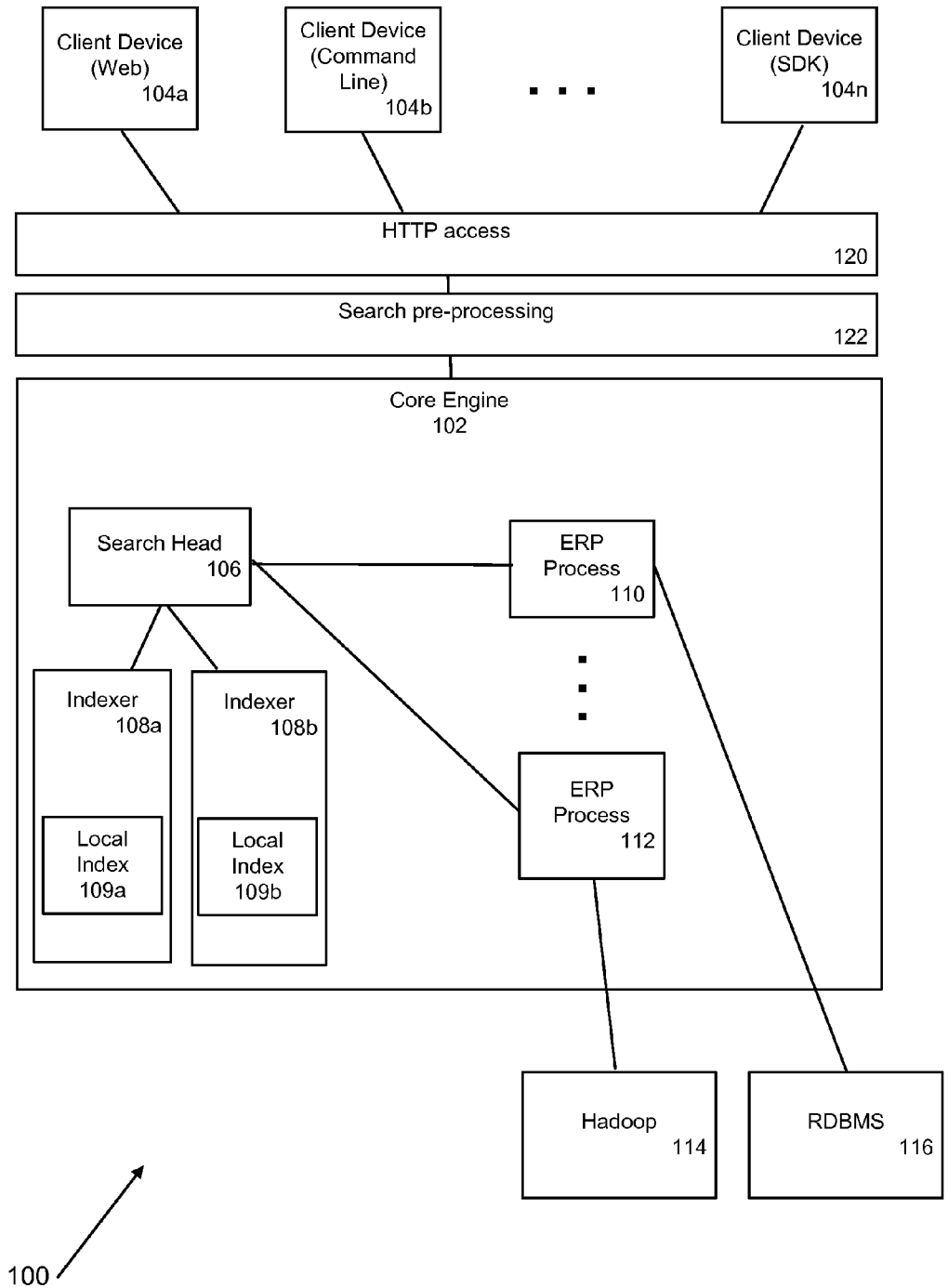
FIG. 1 is a block diagram of an example of a computer system that provides the features disclosed herein.

FIG. 1 shows a block diagram of an example of a computer search support system 100 that provides the disclosed features. A search support system may be any system enabling the management, storage, and retrieval of data. In recent years, search support systems involving semi-structured or completely unstructured data have become more common. Exemplary systems of this kind include Splunk Enterprise produced by Splunk Inc. of San Francisco, Calif. Other exemplary systems of this kind include Hadoop, Cassandra, and MongoDB. A subset of search support systems that operate on unstructured data also provide late binding schema, which imposes structure on the data at query time rather than at storage or ingestion time.

A core engine 102 of the search support system receives search requests from one or more client devices 104 over network connections. FIG. 1 illustrates that multiple client devices 104a, 104b, . . . , 104n may communicate with the core engine 102; the devices will be collectively referred to without their respective suffixes as client devices 104. The client devices 104 may communicate with the core engine using a variety of connections. For example, one client device in FIG. 1 is illustrated as communicating over an Internet (Web) protocol, another client device is illustrated as communicating via a command line interface, and another client device is illustrated as communicating via a system developer kit (SDK). These illustrated communication connections, and suitable alternatives, will be known to those skilled in the art. The ellipses between the client devices indicate additional and different client devices that may be included in the system 100.

The core engine 102 analyzes the received search request to identify request parameters. The search support system 100 is typically configured to interface with data collections that are maintained according to support system protocols, and are often maintained in an access scheme that is proprietary to the support system. Throughout this specification, such data collections that are "local" or "native" to the search support system are referred to as an "index" or "indices." An "indexer" is a system included in a search support system that manages one or more indices, thereby providing a search interface to access data in the index for the search support system.

If a search request received from one of the client devices 104 references an index maintained by the search support system, then a search head process 106 of the core engine 102 connects to one or more system indexers 108 of the search support system 100 for the index referenced in the request parameters. That is, if the request parameters of the search request reference an index, then the search head process access the data in the index via the indexer. FIG. 1 illustrates that multiple indexers 108a, 108b may be provided with the core engine 102. When referenced in general, the indexers will be collectively referred to without their respective suffixes as indexers 108. The core engine 102 may include one or more indexers 108, depending on system access resources and requirements. As described further below, the indexers 108 retrieve data from their respective local indices as specified in the search request. The indexers and their respective local indices typically reside on the same system, though they may be connected via a local network connection. FIG. 1 shows each indexer 108a, 108b with a corresponding respective local index 109a, 109b.

If the request parameters of the received search request reference an external data collection, which is not accessible to the indexers 108 or under the management of the search support system, then the FIG. 1 search support system 100 will access the external data collection through an External Result Provider (ERP) process. Throughout this specification, an external data collection is referred to as a "virtual index" (plural, "virtual indices"). An ERP process provides an interface through which the search head 106 may access virtual indices.

Thus, a search reference to an index of the system is understood to relate to a locally stored and managed data collection, but a search reference to a virtual index is understand to relate to an externally stored and managed data collection, which the search head must access through one or more ERP processes. FIG. 1 shows two ERP processes 110, 112 that connect to respective remote (external) virtual indices, which are indicated as a Hadoop system 114 and a relational database management system (RDBMS) 116. Other virtual indices may include other file organizations and protocols, such as Structured Query Language (SQL) and the like. The ellipses between the ERP processes 110, 112 indicate optional additional ERP processes of the system 100. An ERP process is a computer process that is initiated or spawned by the search head process 106 and is executed by the core engine 102.

The search head process 106 may spawn only a single ERP process in response to multiple virtual indexes referenced in a search request, or the search head may spawn different ERP processes for different virtual indices. Generally, virtual indices that share common data configurations or protocols may share ERP processes. For example, all search query references to a Hadoop file system may be processed by the same ERP process, if the ERP process is suitably configured. Likewise, all search query references to a SQL database may be processed by the same ERP process. In addition, the search head may provide a common ERP process for common external data source types (i.e., a common vendor may utilize a common ERP process, even if the vendor includes different data storage system types, such as Hadoop and SQL). Common indexing schemes also may be handled by common ERP processes, such as flat text files or Weblog files.

The search head process 106 determines the number of ERP processes to be initiated via the use of configuration parameters that are included in a search request message. Generally, there is a one-to-many relationship between an external results provider "family" and ERP processes, and there is also a one-to-many relationship between an ERP process and corresponding virtual indexes that are referred to in a search request. For example, using RDBMS, assume two independent instances of such a system by one vendor, such as one RDBMS for production and another RDBMS used for development. In such a situation, it is likely preferable (but optional) to use two ERP processes, to maintain the independent operation as between production and development data, but both of the ERPs will belong to the same family, because the two RDBMS system types are from the same vendor. Continuing the example, assume that three virtual indexes are defined for each of the ERP processes, with a virtual index reference indicated by "vix", the three virtual indexes are: prod_vix_1, prod_vix_2, and prod_vix_3 (in the production system) and dev_vix_1, dev_vix_2, and dev_vix_3 (in the development system). If the search request is such that a single ERP process can provide results for more than one virtual index referenced in the search request, then only one ERP process will be spawned by the search head process 106. For example, if the search request is of the form:

index=dev_vix_1 OR index=dev_vix_2, then the search head process will determine that the two arguments "dev_vix_1" and "dev_vix_2" involve a common virtual index, namely, "dev". The search head process will spawn only the "dev" ERP process, and that ERP process will be asked to provide results for both referenced virtual indexes. When the search request has a different format, such as:

index=dev_vix_1 OR index=dev_vix_2 OR index=prod_vix_3, then the search head process will determine that the search request contains two arguments "dev_vix_1" and "dev_vix_2" with a common virtual index, namely, "dev", and the search request also contains an argument "prod_vix_3" with a "prod" virtual index. The search head process will determine that two ERP processes are needed: one for the prod index and another for the dev indexes. In this way, the search head process determines the number and type of ERP processes needed to satisfy the search request, and the search head process will instantiate or spawn the corresponding determined ERP processes.

The ERP process 110, 112 may receive a search request from the search head process 106, which may also provide request analysis such as described above. The search head process may optimize the received search request for execution at the respective external virtual index. Alternatively, the ERP process may receive a search request as a result of analysis performed by the search head process or by a different system process. The ERP process 110, 112 communicates with the search head process 106 via conventional input/output routines (e.g., standard in/standard out). In this way, the ERP process receives the search request from a client device such that the search request may be efficiently executed at the corresponding external virtual index.

The ERP process 110, 112 may be provided as a process of the core engine 102. Each ERP process may be provided by the core engine, or may be provided by process or application providers who are independent of the search support system 100. Each respective ERP process may include an interface application installed at a computer of the external result provider that ensures proper communication between the core engine and the external result provider. As described further below, the ERP processes 110, 112 will generate appropriate search requests in the protocol and syntax of the respective virtual indices 114, 116 each of which corresponds to the search request received by the core engine 102. Upon receiving search results from their corresponding virtual indices, the respective ERP process passes the result to the search head 106, which may return the results to the core engine for processing and may then terminate operation of the respective ERP process 110, 112.

FIG. 1 shows that the client devices 104 communicate with the core engine 102 through a conventional network interface, such as through the Internet protocol, indicated as HTTP access 120 in FIG. 1. Communications with the core engine continue after the network access to a search pre-processing block 122, which may perform format checking, authorization processing, and the like.

System Operations

Figure 2:
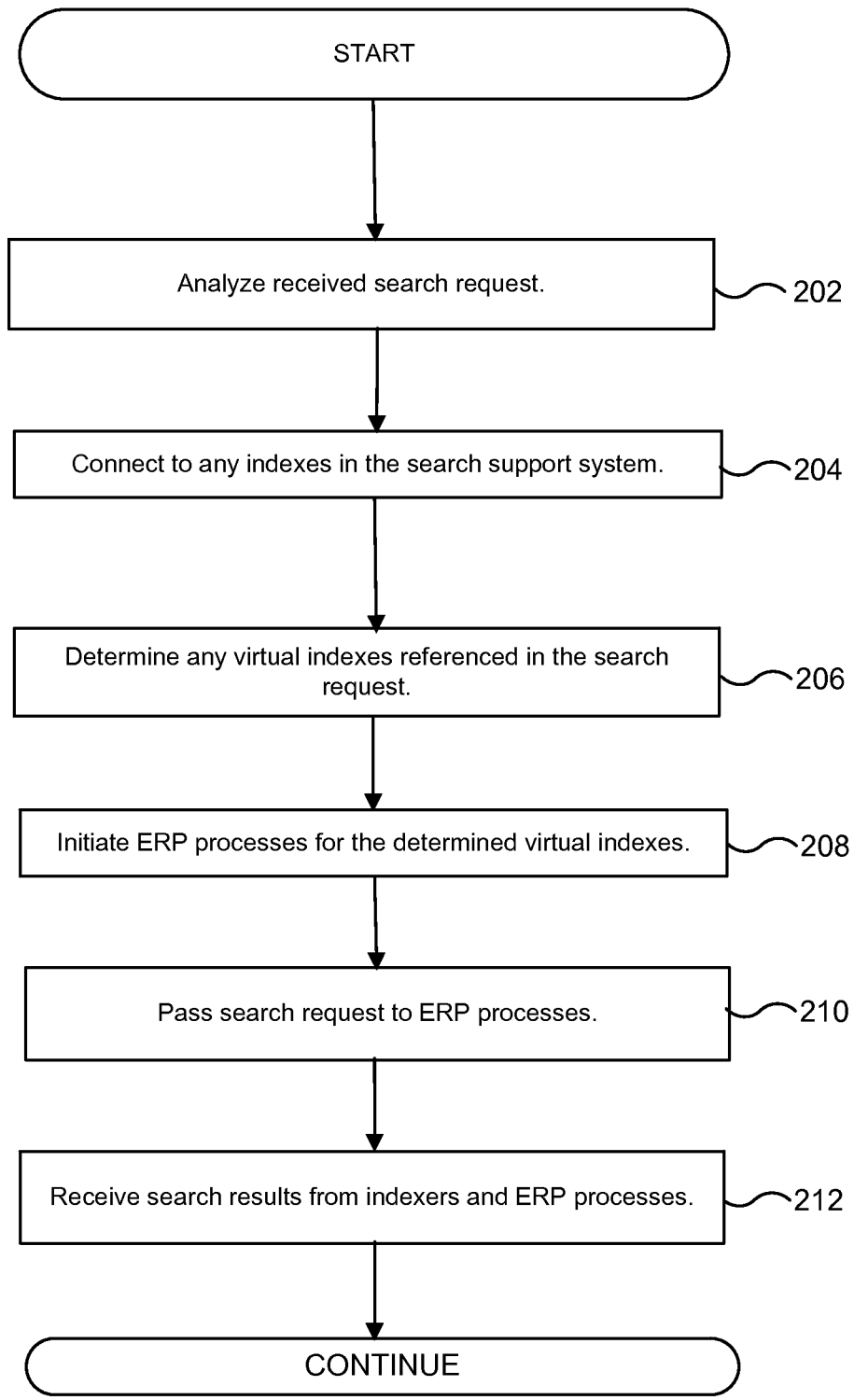
FIG. 2 is a flow diagram of an example of the processing performed by the system illustrated in FIG. 1.

FIG. 2 shows a flow diagram of an example of the processing performed by the system illustrated in FIG. 1. At the first operation, indicated by the flow diagram box numbered 202, the core engine receives a search request from a client device and analyzes the search request. The analysis includes request processing, such as protocol checking syntax checking, and the like. More particularly, the core engine parses the search request to identify all commands in the request and to identify two portions of the search request: a local portion and a remote portion. The local portion identifies the part of the search request that can only be performed by the search head process. The remote portion identifies the part of the search request that can be executed on the indexers or by external result providers for remote (external) data sources and corresponding ERP processes. The core engine then determines all the indexers that would provide data for the non-virtual indexes referenced in the search request.

At the next operation, indicated by the box 204, the core engine uses the search head process to connect to any local indexers (local data sources) in the search support system referenced in the received search request. The indexers are provided with the received search request.

The next operation, indicated by the box numbered 206, is for the core engine to determine any virtual indexes referenced in the received search request. Such search request references may comprise, for example, an identification of an external result provider or other third party indices from which search results are desired, such as the aforementioned Hadoop, RDBMS, and SQL. The determination of virtual indexes is a result of the search request analysis performed by the search head process.

The next operation, indicated by the box 208, is for the search head to initiate an ERP process for the determined virtual indexes. As noted above, a single ERP process may be spawned or instantiated for groups of virtual indexes, or a single ERP process may be spawned for each virtual index, as determined by the search head process. An ERP process is a process that is executed in the core engine operating system environment.

In the next operation, indicated by the box numbered 210, the ERP processes 110, 112 (FIG. 1) generate a search request and pass it to a corresponding external result provider (i.e., virtual indices 114, 116) such that the search request to the external result provider corresponds to the search request passed to the indexers 108. The core engine 102 passes the received search request to the proper ERP processes to retrieve the desired search results. The search request includes operating parameters, configuration information, and arguments for proper runtime implementation. The search request is passed to an ERP process as part of the request to spawn the ERP process, in the action arguments of the search request. The search head process 106 optimizes the search request for each virtual index for which the ERP process will provide results. The ERP process, however, is free to ignore the optimized search request and provide a much larger superset of the results. That is, the search head process is responsible for the final filtering of the results returned by the ERP process and for guaranteeing the result set is correct.

As noted above, an ERP process can request results for more than one virtual index referenced in a search request. Because a search request can reference more than one virtual index, more than one external result provider may be spawned by a search request. In the FIG. 1 system, a single ERP process may be given responsibility for multiple referenced indexes. In such a configuration, one ERP process is initiated by the search head for all the referenced virtual indexes for which that ERP process is responsible. Alternatively, each ERP process may be assigned responsibility for a single corresponding virtual index.

The core engine 102 and search head process 106 ultimately receive the search request results from the indexers 108, and also from the ERP processes 110, 112. This operation is indicated by the box 212 in FIG. 2. The search head process receives the search results, including intermediary results that are returned with search results updated in real time and final results that comprise results of the search request after the request processing on the recited indices are completed.

Configuration Parameters

FIG. 3 is a diagrammatic representation 300 of the parameters in a search request that is passed by the system illustrated in FIG. 1. FIG. 3 shows that the parameters in a search request include action information 302, configuration information 304, and action arguments 306. The particular format and content of the parameters 300 will depend on the search support system 100 in use. In the FIG. 1 system, the action information comprises a search indicator, the configuration information reflects the indexer information for the system 100 (FIG. 1), and the runtime arguments include information such as a time range over which the index will be searched, text of the search string in the request, and the like.

As an example of search request processing, a search request may comprise the following text string:

index=main OR index=vix_1|stats count by index

After the search request is processed and optimized by the search head process, the local portion of the search request (i.e., what is executed on the search head process) comprises the portion of the search request as follows:

stats count by index and the remote portion of the search request comprises a combination of local and remote references, the remote portion of the search request as follows:

index=main|prestats count by index (remote part executed by indexers)

index=vix_1|prestats count by index (remote part executed by ERP).

In this example, the original search request string does not contain any reference to "prestats", this command is added by the search head process during the analysis of the search request and is used to push down computation tasks to remote systems (indexers or ERPs).

Figure 4:
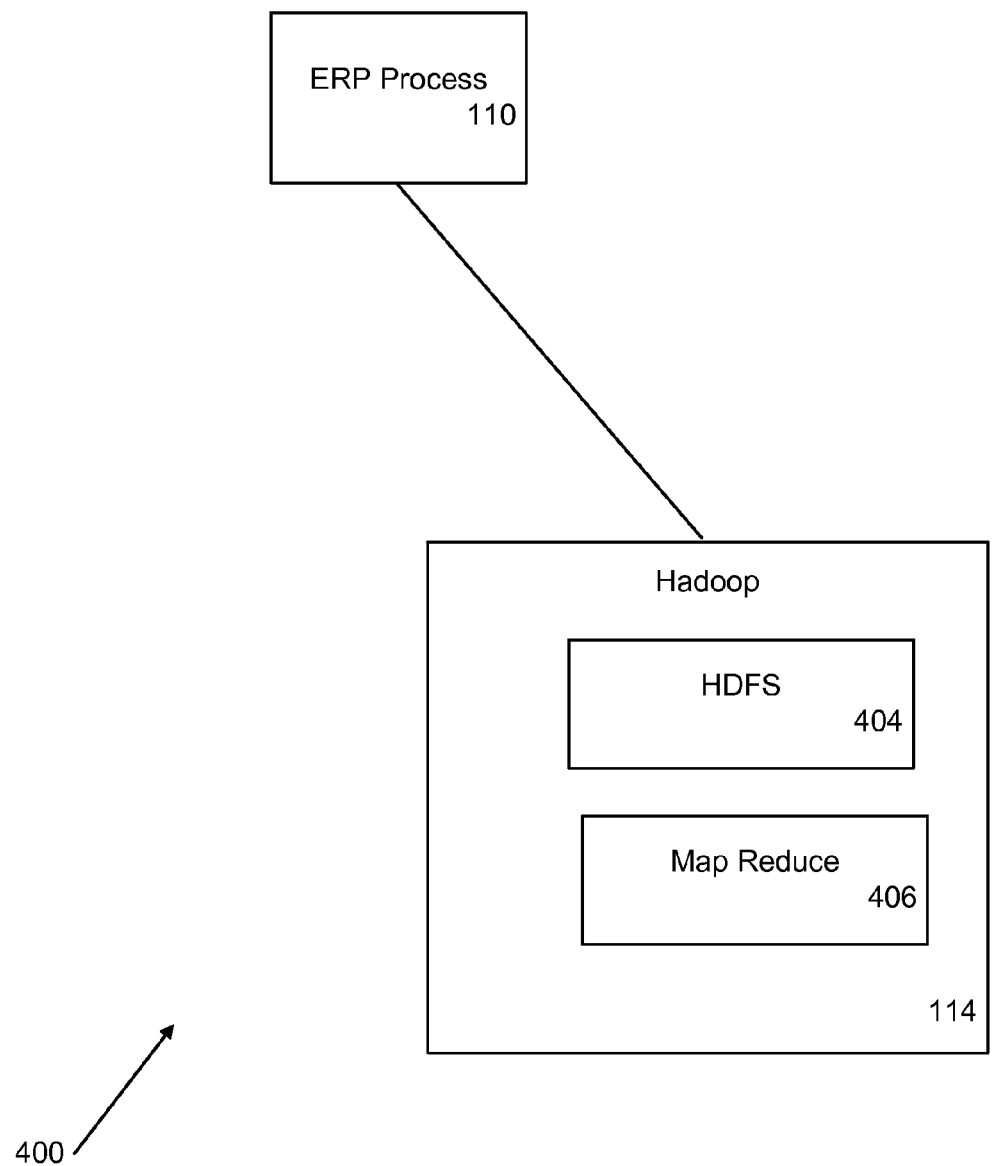
FIG. 4 is a block diagram of a system configuration for the system illustrated in FIG. 1 for performing searches on HADOOP external sources.

FIG. 4 is a block diagram representation of details for a system configuration of the system illustrated in FIG. 1 for performing searches on Hadoop external sources. That is, the Hadoop system 114 illustrated in FIG. 1 provides an interface to a Hadoop-based data system. FIG. 4 shows that the Hadoop system 114 includes a Hadoop distributed file system (HDFS) component 404 and a Map Reduce component 406, as will be known to those skilled in the art.

Exemplary Hardware System

The systems and methods described above may be implemented in a number of ways. One such implementation includes computer devices having various electronic components. For example, components of the system in FIG. 1 may, individually or collectively, be implemented with devices having one or more Application Specific Integrated Circuits (ASICs) adapted to perform some or all of the applicable functions in hardware. Alternatively, the functions may be performed by one or more other processing units (or cores), on one or more integrated circuits or processors in programmed computers. In other embodiments, other types of integrated circuits may be used (e.g., Structured/Platform ASICs, Field Programmable Gate Arrays (FPGAs), and other Semi-Custom ICs), which may be programmed in any manner known in the art. The functions of each unit may also be implemented, in whole or in part, with instructions embodied in a memory, formatted to be executed by one or more general or application-specific computer processors.

Figure 5:
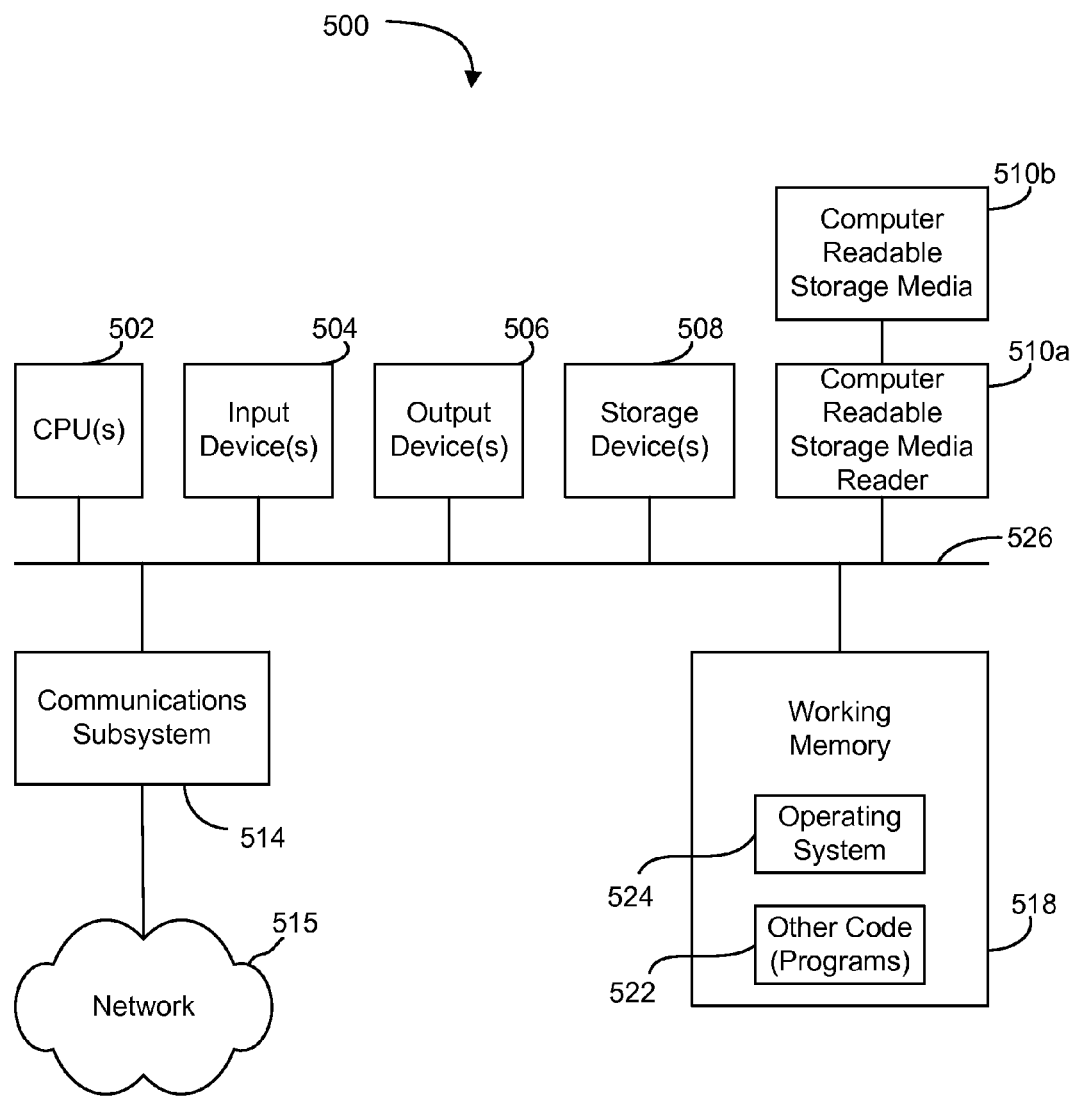
FIG. 5 is a block diagram of an example showing a computer system that operates in the FIG. 1 system.

FIG. 5 provides a block diagram of a computer system 500 for implementing functions and operations as described herein. The computer system 500 may implement, for example, any one or all of the search support system 100, core engine 102, client devices 104, search head 106, indexer 108, ERP processes 110, 112, and virtual indices 114, 116 as illustrated in FIG. 1. It should be noted that FIG. 5 is meant only to provide a generalized illustration of various components, any or all of which may be utilized as appropriate. FIG. 5, therefore, broadly illustrates how individual system elements may be implemented in a relatively separated or relatively more integrated manner.

The system 500 is shown comprising hardware elements that can be electrically coupled via a system bus 526 (or may otherwise be in communication, as appropriate). The hardware elements can include one or more central processor units (CPUs) 502, including without limitation one or more general-purpose processors and/or one or more special-purpose processors (such as communication processing chips, graphics acceleration chips, and/or the like); one or more input devices 504, that can include, without limitation, a mouse, a keyboard, and/or the like; and one or more output devices 506, which can include without limitation a display device, a printer, audio device, and/or the like.

The computer system 500 may further include (and/or be in communication with) one or more storage devices 508, which can comprise, without limitation, local and/or network accessible storage and/or can include, without limitation, a disk drive, a drive array, an optical storage device, solid-state storage device such as a random access memory ("RAM"), and/or a read-only memory ("ROM"), which can be programmable, flash-updateable, and/or the like. The computer system 500 might also include a communications subsystem 514, which can include without limitation a modem, a network card (wireless or wired), an infra-red communication device, a wireless communication device and/or chipset (such as a Bluetooth device, an 502.11 device, a WiFi device, a WiMax device, cellular communication facilities, etc.), and/or the like. The communications subsystem 514 may permit data to be exchanged with a network 515, and/or any other devices described herein. The network 515 may comprise a local area network (LAN) or a network such as the Internet, or a combination. In many embodiments, the computer system 500 will further include a working memory 518, which can include a RAM or ROM device, as described above.

The computational system 500 also may comprise software elements, shown as being currently located within the working memory 518, including an operating system 524 and/or other program code, such as one or more application programs 522, which may comprise computer programs performing tasks and operations described above, and/or may be designed to implement methods in accordance with the disclosed subject matter and/or systems in accordance with the disclosed subject matter, as described herein. Merely by way of example, one or more procedures described with respect to the method(s) discussed above might be implemented as code and/or instructions executable by a computer (and/or a processor within a computer). In one embodiment, the data generating and presenting operations are implemented as application programs 522. In the description herein, references to "interface" and "processor" and "application" should be understood as referring to hardware, software, and combinations of the two, either as independent components (hardware, software, and/or both) for each interface, processor, or application, or as integrated components combined with one or more other components.

A set of these instructions and/or code may be stored on a computer readable storage medium 510b. In some embodiments, the computer readable storage medium 510b may comprise the storage device(s) 508 described above. In other embodiments, the computer readable storage medium 510b might be incorporated within the computer system. In still other embodiments, the computer readable storage medium 510b might be separate from the computer system (i.e., it may be a removable readable medium, such as a compact disc, etc.), and or might be provided in an installation package, such that the storage medium can be used to program a general purpose computer with the instructions/code stored thereon. These instructions might take the form of executable code, which is executable by the computer system 500 and/or might take the form of source and/or installable code, which, upon compilation and/or installation on the computer system 500 (e.g., using any of a variety of generally available compilers, installation programs, compression/decompression utilities, etc.), then takes the form of executable code. In these embodiments, the computer readable storage medium 510b may be read by a computer readable storage media reader 510a.

It will be apparent that variations may be made in accordance with specific requirements. For example, customized hardware might also be used, and/or particular elements might be implemented in hardware, software (including portable software, such as applets, etc.), or both. Further, connection to other computing devices such as network input/output devices may be employed.

In one embodiment, local and remote computer systems (such as the computer system 500) are utilized to perform methods of the disclosed subject matter. According to a set of embodiments, some or all of the procedures of such methods are performed by the computer system 500 in response to the processor 502 executing one or more sequences of one or more instructions (which might be incorporated into the operating system 524 and/or other code, such as an application program 522) contained in the working memory 518. Such instructions may be read into the working memory 518 from another machine-readable medium, such as one or more of the storage device(s) 508 (or 510). Merely by way of example, execution of the sequences of instructions contained in the working memory 518 might cause the processor(s) 502 to perform one or more procedures of the methods described herein.

The terms "machine readable medium" and "computer readable medium," as used herein, refer to any medium that participates in providing data that causes a machine to operate in a specific fashion. In an embodiment implemented using the computer system 500, various machine-readable media might be involved in providing instructions/code to processor(s) 502 for execution and/or might be used to store and/or carry such instructions/code (e.g., as data transmissions or data communications). In many implementations, a computer readable medium is a physical and/or tangible storage medium. Such a medium may take many forms, including but not limited to, volatile and non-volatile media. Non-volatile computer-readable media includes, for example, optical or magnetic disks, such as the storage device(s) (508 or 510). Volatile computer-readable media includes, without limitation, dynamic memory, such as the working memory 518. In some implementation, data may be carried over transmission media. Transmission media includes coaxial cables, copper wire, and fiber optics, including the wires that comprise the bus 526, as well as the various components of the communication subsystem 514 (and/or the media by which the communications subsystem 514 provides communication with other devices). Hence, transmission media can also take the form of waves (including, without limitation, radio, acoustic, and/or light waves, such as those generated during radio-wave and infra-red data communications).

Common forms of physical and/or tangible non-volatile computer readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, an EPROM, a FLASH-EPROM, any other memory chip or cartridge, or any other medium from which a computer can read instructions and/or code.

Various forms of machine-readable media may be involved in carrying one or more sequences of one or more instructions to the processor(s) 502 for execution. Merely by way of example, the instructions may initially be carried on a magnetic disk and/or optical disc of a remote computer. A remote computer might load the instructions into its dynamic memory and send the instructions communications over a transmission medium to be received and/or executed by the computer system 500. These communications, which might be in the form of electromagnetic communications, acoustic communications, optical communications, and/or the like, are all examples of carrier waves on which instructions can be encoded, in accordance with various embodiments of the disclosed subject matter.

The communications subsystem 514 (and/or components thereof) generally will receive the communications, and the bus 526 then might carry the communications (and/or the data, instructions, etc. carried by the communications) to the working memory 518, from which the processor(s) 502 retrieves and executes the instructions. The instructions received by the working memory 518 may optionally be stored on a storage device 508 either before or after execution by the processor(s) 502.

ERP Process Features

The ERP processes described above may include two operation modes, a streaming mode, and a reporting mode. The ERP processes can operate in streaming mode only, or reporting mode only, or in both modes simultaneously. Operating in both modes simultaneously is referred to as mixed mode operation. Further, it will be appreciated that in mixed mode operation, the ERP at some point can stop providing the search head with streaming results and only provide reporting results thereafter, or the search head at some point may start ignoring streaming results it has been using and only use reporting results thereafter.

The streaming mode returns search results in real time with minimal processing, in response to the search request. The reporting mode provides results of a search request with processing of the search results prior to providing them to the requesting search head process, which in turn provides results to the requesting client device. ERP operation with such multiple modes provides greater flexibility in the performance of the ERP process with regard to report time, search latency, and resource utilization.

In mixed mode operation, both streaming mode and reporting mode are operating simultaneously. The streaming mode results (i.e., the raw data obtained from the external data source) are provided to the search head process, which can then process the results data (e.g., break the raw data into events, timestamp it, filter it, and the like) and integrate the results data with the results data from other external data sources, and/or from data stores of the search head process. The search head process performs such processing and can immediately start returning interim results to the user at the requesting client device, providing the streaming mode results, while the search head process is simultaneously waiting for the ERP process to process the data it is retrieving from the external data source as a result of the concurrently executing reporting mode.

In some instances, the ERP process initially operates in a mixed mode, such that the streaming mode operates to enable the ERP quickly to return interim results (i.e., some of the raw, or unprocessed, data necessary to respond to a search request) to the search head, enabling the search head to process it and start providing to the client or search requester interim results that are responsive to the query. Meanwhile, in this mixed mode, the ERP also operates concurrently in reporting mode, processing portions of raw data in a manner responsive to the search query. Upon determining that it has results from reporting mode available to return to the search head, the ERP may halt mixed mode at that time (or some later time) by stopping the return of data in streaming mode to the search head, switching to reporting mode only. The ERP at this point starts sending interim results in reporting mode to the search head, which in turn may then present this processed data responsive to the search request to the client or search requester. Typically the search head switches from using results from the ERP's streaming mode of operation to results from the ERP's reporting mode of operation at the point where the higher bandwidth results from the reporting mode outstrips the amount of data processed by the search head in the lower bandwidth streaming mode of ERP operation.

One reason reporting mode is typically higher bandwidth is because the ERP does not have to spend time transferring to the search head for processing all the raw data, and another reason is because the ERP may optionally direct another processor to do the processing.

One should recognize that it is not necessary to halt at any point the streaming mode of operation to gain the higher bandwidth benefits of reporting mode; the search head could simply stop using the streaming mode results—and start using the reporting mode results—at some point at which the bandwidth of the reporting mode has caught up with or exceeded the amount of bandwidth provided by the streaming mode. Thus, a variety of triggers and ways to accomplish a switch from the search head using or the ERP transferring streaming mode results to reporting mode results may occur to one skilled in the art.

The reporting mode can involve the ERP process (or an external system) performing event breaking, time stamping, filtering of events to match the search query request, and calculating statistics on the results. Whether or not events are the ultimate answer to a search query, or whether or not statistics are the ultimate answer, depends on the search query request specified by the user. The user can request particular types of data, such as where the search query itself involves types of events, or the search request may ask for statistics on data, such as on events that meet the search request; either query phrasing is possible. In either case, the search head process understands the query language used in the received query request, which may be a proprietary language. For example, the search head process may understand the query language used by the assignee of the application, Splunk Inc. (a query language commonly called SPL, or Splunk Processing Language) and the search head process typically understands how to use that language to obtain data from the indexers (See FIG. 1), which store data in a Splunk-specific format.

The ERP processes support the search head process, as the search head processes are not ordinarily configured to understand the format in which data is stored in external data sources such as Hadoop or SQL data systems. Rather, the ERP process performs that translation from the format for what has been requested by the search query that has been submitted in the search support system's native format (e.g., SPL if Splunk Enterprise is used as the core system) to the format in which a search query request will be accepted by the corresponding external data system. The external data systems typically store data in a different format from that of the search support system's native index format, and utilize a different query language (e.g., SQL or MapReduce, rather than SPL or the like).

As noted, the ERP process can operate in the streaming mode alone. After the ERP process has performed the translation of the query request referred to above, and once the ERP process has returned the raw results from the streaming mode, the search head process can operate on the returned data and can integrate the returned data with any data obtained from local data sources (i.e., native to the search support system) and from other external data sources and from other ERP processes (if such operations were required to satisfy the terms of the search query). Thus, one advantage of mixed mode operation is that, in addition to streaming mode, the ERP process is also executing concurrently in the reporting mode, so that the ERP process (rather than the search head process) is processing query results (e.g., performing event breaking, timestamping, filtering, and possibly calculating statistics if required to be responsive to the search query request). It should be apparent that additional time is needed for the ERP process to perform the processing in such a configuration. Therefore, the streaming mode will allow the search head process to start returning interim results to the user at the client device before the ERP process can complete sufficient processing to start returning any search results. The switchover between streaming and reporting mode happens when the ERP process determines that the switchover is appropriate, such as when the ERP process determines it can start returning meaningful results from its reporting mode.

The operation described above illustrates the source of operational latency: streaming mode has low latency (one obtains immediate results) and usually has relatively low bandwidth (fewer results can be returned per unit of time), whereas the concurrently running reporting mode has relatively high latency (it has to perform a lot more processing before returning any of the results) and usually has relatively high bandwidth (more results can be processed per unit of time). For example, when the ERP process does start returning report results, it returns a lot more (processed) results than in the streaming mode, because, e.g., statistics only need to be calculated to be responsive to the search request. That is, the ERP process doesn't have to take time to first return raw data to the search head process. As noted, the ERP process could be configured to operate in streaming mode alone and return just the raw data for the search head process to process in a way that is responsive to the search request (which may have requested certain types of events, or statistics on those events). Alternatively, the ERP process can be configured to operate in the reporting mode only. Also alternatively, the ERP process can be configured to operate in streaming mode and reporting mode concurrently, as described, with the ERP process stopping the transmission of streaming results to the search head process when the concurrently running reporting mode has caught up and started providing results. The reporting mode does not require the processing of all raw data that is responsive to the search query request before the ERP process starts returning results, rather, the reporting mode usually performs processing of chunks of events at a time and returns the processing results to the search head for each chunk.

For example, an ERP process can be configured to perform as simply as returning the contents of a search result file verbatim, with little or no processing of results, such that a search head process performs all processing such as breaking byte streams to events, filtering, and the like, or the ERP process can be configured to perform more flexibly, such as analyzing the search request and handling all the computation that a native search indexer process would otherwise perform. In this way, the configured ERP process provides greater flexibility in features while operating according to desired preferences in terms of response latency and resource requirements.

FIG. 6 is a representation of operating mode features available in the ERP processes illustrated in FIG. 1. FIG. 6 shows a table 600 with three columns, a left-most column 601 indicating what each row shows, column 602 that shows operating features available with the streaming mode of the ERP process, and a column 604 that shows operating features available with the reporting mode of the ERP process.

Row 610 of table 600 identifies the communication channel for the two modes. In this example, both modes are identified as providing standard, conventional communication routines for receiving and/or transmitting messages. Row 612 identifies an ERP output type. In streaming mode, the output includes raw data. For example, an ERP process operating on external data source with a flat text file in the streaming mode would return the actual text data from the data source that is received from the source in response to the search request, with little or no processing. In reporting mode, the output includes processed data (e.g., including statistics or determinations of received data in accordance with the search request). For example, the ERP process can identify subdivisions in the received data and can determine data value frequencies of occurrence in the received data. Such processed data can be presented in a report format according to parameters of the search support system or according to the search request.

Row 614 identifies which component performs schema binding, which can include, e.g., breaking a received byte stream into events or records and/or extracting a time stamp. In the ERP streaming mode, schema binding is performed by the search head. Meanwhile, in the ERP reporting mode, schema binding is performed by the ERP. Row 616 identifies which component performs processing, such as filtering, statistics and/or aggregation. In streaming mode, the processing is performed by the search head. Specifically, the search head takes the raw data from the ERP, schematizes it, and then performs processing on it. In reporting mode, processing is performed by the ERP or by an external system that is directed and/or controlled by the ERP.

Row 618 identifies which component generates a final search result. The generation can include, e.g., merging results from the ERP with results from other ERPs and/or with results from local indices. In both modes, the final result generation is performed by the search head. In streaming mode, it is performed after the search head processes results from the ERP. In reporting mode, the generation can be immediately performed upon receiving the processed results, as the ERP performed the processing. Row 620 identifies the tradeoffs for the respective modes. As shown, the reporting mode results in greater latency and bandwidth relative to the streaming mode. It will be appreciated that the modes can be operated concurrently, though it is generally more difficult to program a mixed-mode ERP process. For example, streaming mode operation is relatively easy to configure, and the ERP process can be configured to operate that mode only.

It should be noted that the streaming mode, the ERP returns raw data to the search head process in a continuous manner (e.g., returns the contents of a file—raw data—as it is retrieved), whereas in the reporting mode, the ERP returns processed data (such as filtered results, aggregates and/or statistics determined by processing the raw data) as portions of the data are processed by the ERP or under the direction of the ERP, though the time required to process a block of raw data in reporting mode will typically mean that the ERP first starts returning results in reporting mode after it has started to return raw data in streaming mode. It should be noted that an ERP process that can operate in the reporting mode should also be able to operate in the streaming mode so that if the user specifies a search that requires no processing, the data can be provided by the ERP.

As mentioned, the ERP provides the results it generates to the search head. The search head operates on the output of the streaming mode, as well as of the reporting mode, and integrates the information with data responsive to the search request from any local data stores and from other virtual indices as provided by other ERP processes. As noted though, before integration, in results provided by an ERP in streaming mode, if the data provided is unstructured, then the search process needs to first bind schema to the data to extract valuable information from that data to provide fields on which that data can be operated on and/or searched by the search support system; exemplary schema binding may include breaking the raw data up into separate events and extracting time stamps from the events.

Because a search support system with a late binding schema can use ERPs to access unstructured or structured data from virtual indices and then also make that data searchable in the same way it makes its locally indexed data searchable, ERPs are especially useful in such systems. If the search support system were not late binding or could not deal with unstructured data, it might be difficult to access and make use of unstructured data from a virtual index.

Figure 7:
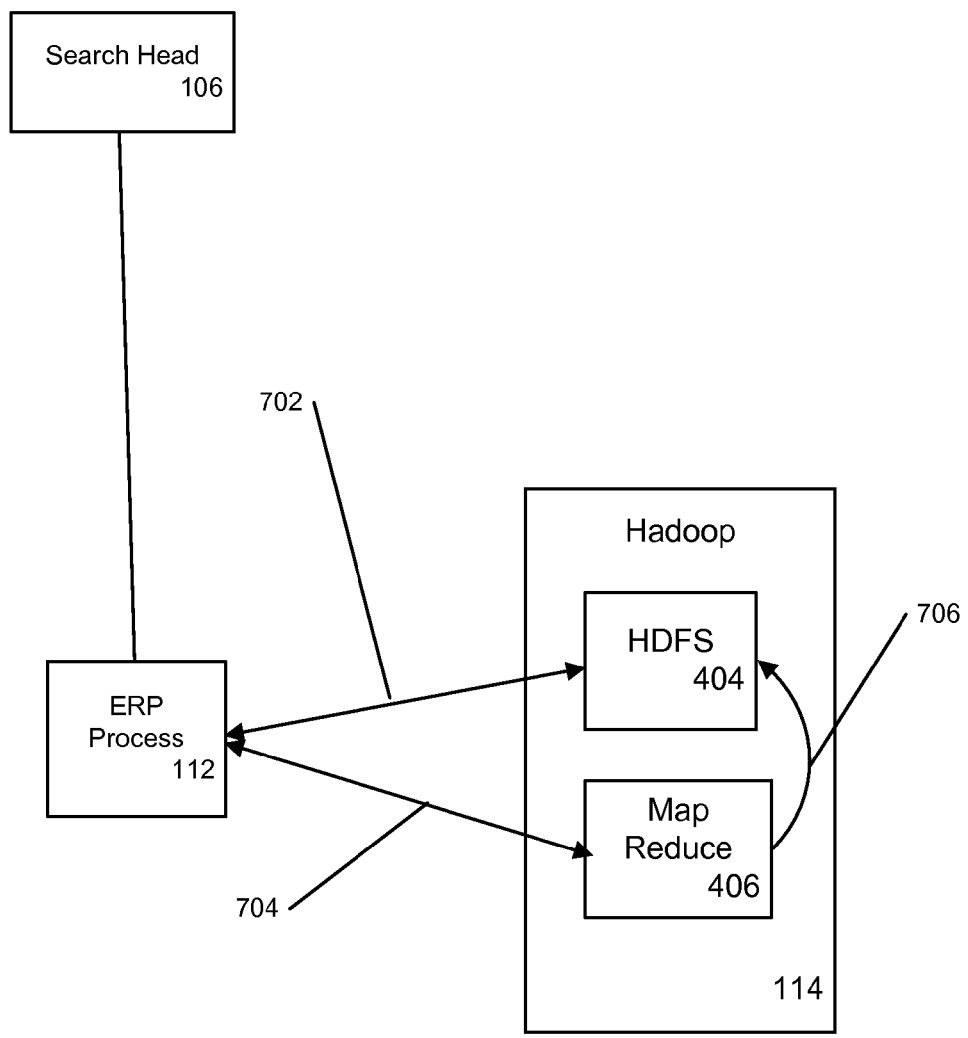
FIG. 7 is a block diagram showing details of the ERP process of FIG. 1 for search request processing of a Hadoop data source.

FIG. 7 is an example of details for ERP processing as applied to a Hadoop virtual index. FIG. 7 shows some details from FIG. 1. In FIG. 7, the ERP process 112 is shown communicating with the HDFS 404 of the Hadoop system 114, with the double-ending arrow 702 representing the communication that occurs between the ERP process and the HDFS. The arrow 704 represents the search request being submitted to the Map Reduce block 406, and the curved arrow 706 represents the search results being communicated to the HDFS for output.

An example of Hadoop processing involves a user search request to generate a report based on a number of files residing in an HDFS data system. Thus, the search support system uses a virtual index (i.e., the HDFS system) that contains all the requested files, and the ERP process has been correctly configured with parameters or configurations such as host, port, credential information, and the like. Assuming the ERP process for Hadoop is a reporting ERP which can also operate in mixed mode (i.e., operation in streaming and reporting mode), upon receiving a search request, the ERP process operates as follows:

(a) the ERP process starts operation in streaming mode, streaming files responsive to the query;
(b) concurrently with (a), the ERP process starts executing a MapReduce job (made up of many tasks) to create reports for the files in the Hadoop system, the details of which will be known to those skilled in the art;
(c) at a later time, the ERP process stops operating in the streaming mode as soon as the first MapReduce task completes, that is, the ERP process switches from streaming mode to reporting mode only in response to completion of the first MapReduce task.

Thus, the reporting mode operation supports returning of results after completion of each MapReduce task. The reporting mode is continuous and doesn't wait until complete processing of all of the data in the external data source has occurred before returning results to the search support system, but it often doesn't return results as quickly as the streaming mode does.

Figure 8:
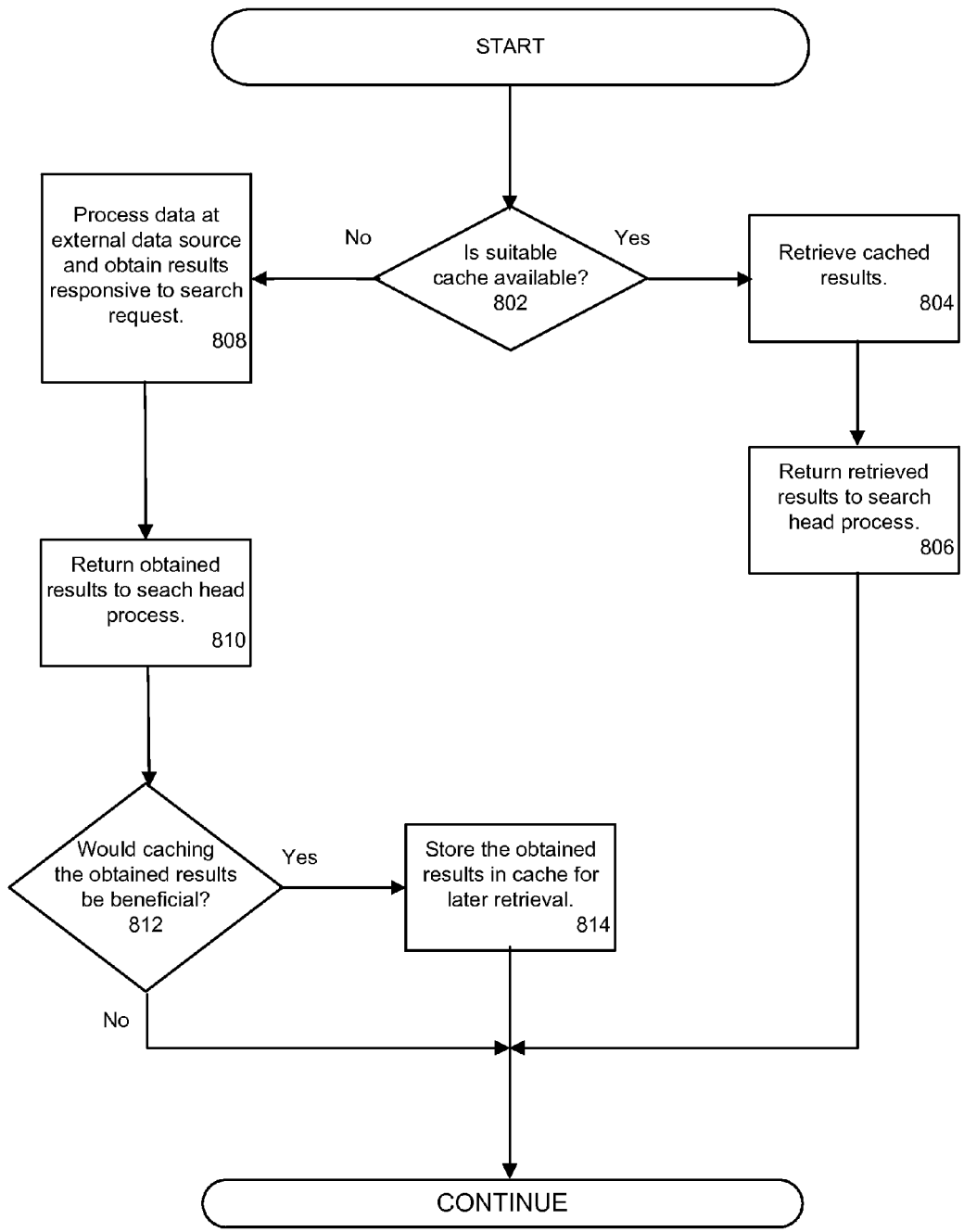
FIG. 8 is a flow diagram of an example of the processing performed by the ERP process of FIG. 1.

FIG. 8 is a flow diagram of an example of the processing performed by the ERP process of FIG. 1. FIG. 8 shows that caching operations may be supported by the FIG. 1 system, regardless of whether the ERP operates in streaming mode, reporting mode, or mixed mode. Examples of some ways to cache data in response to search queries are discussed in U.S. application Ser. No. 13/664,231, entitled "Transparent Index Summarization," assigned to the assignee of the current application. The contents of the U.S. application Ser. No. 13/664,231 are hereby incorporated by reference in their entireties for all purposes. In the first operation illustrated in FIG. 8, indicated by the flow diagram decision box numbered 802, the ERP process determines if cached results for the received query are available. Such determination occurs prior to the ERP processing any chunk of events or other data from the external data source. The determination by the ERP processor of available cached results will be determined by considering the events being processed and the search being executed.

In the case of cached results being available, an affirmative outcome at the box 802, the ERP process retrieves the cached results, as indicated at the box 804. The ERP process then returns the retrieved results from cache to the search head process (box 806). The ERP process then continues with subsequent retrieval of remaining data for which the cache contains no results.

In the case of no cached results available, a negative outcome at the box 802, the ERP process then processes the data in the external data source, data typically comprising events, as indicated at box 808. The processing comprises executing the received search query on the external data source. The ERP process then returns the results obtained from the processing to the search head process, as indicated at box 810.

After executing the received search query, the ERP process determines if caching the obtained results from processing the data according to the search query (box 808) would be beneficial. This decision, indicated by the box 812, is based on considerations such as the amount of time spent generating the obtained results, the size of the results as compared to the input events, and the frequency of the search query (including, for example, if some or any of these exceed thresholds). It should be noted that the ERP process has access to such computed and accumulated data and statistics. Other ways to determine whether caching search results is beneficial are explored in the aforementioned U.S. application Ser. No. 13/664,231, entitled "Transparent Index Summarization," assigned to the assignee of the current application.

If the ERP process determines that it would be of no benefit to cache the results, a negative outcome at the box 812, then the ERP process then continues with subsequent processing. If the ERP process determines that it would be beneficial to cache the results, an affirmative outcome at the box 812, then the ERP process stores the obtained results in cache for later retrieval, as indicated by the box 814. The cache may be maintained in either the search support system, connected storage, or in the external data sources, such that the cache will be accessible to operations at the decision box 802, that is, to be accessible to the ERP processes of the search support system.

It will be appreciated that many processing capabilities in addition to those described are possible, without departing from the teachings according to the disclosed subject matter. Further, it should be noted that the methods, systems, and devices discussed above are intended merely to be examples. Various embodiments may omit, substitute, or add various procedures or components as appropriate. For example, it should be appreciated that, in alternative embodiments, the methods may be performed in an order different from that described, and that various steps may be added, omitted, or combined. Also, features described with respect to certain embodiments may be combined in various other embodiments. Different aspects and elements of the embodiments may be combined in a similar manner. Also, it should be emphasized that technology evolves and, thus, many of the elements are examples and should not be interpreted to limit the scope of the disclosed subject matter.

Specific details are given in the description to provide a thorough understanding of the embodiments. However, it will be understood by one of ordinary skill in the art that the embodiments may be practiced without these specific details.

Also, it is noted that the embodiments may be described as a process which is depicted as a flow diagram or block diagram. Although each may describe the operations as a sequential process, many of the operations can be performed in parallel or concurrently. In addition, the order of the operations may be rearranged. A process may have additional steps not included in the figures.

Other variations are within the spirit of the present disclosed subject matter. Thus, while the disclosed subject matter is susceptible to various modifications and alternative constructions, certain illustrated embodiments thereof are shown in the drawings and have been described above in detail. It should be understood, however, that there is no intention to limit the disclosed subject matter to the specific form or forms disclosed, but on the contrary, the intention is to cover all modifications, alternative constructions, and equivalents falling within the spirit and scope of the disclosed subject matter, as defined in the appended claims.

Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context.

What is claimed is:

1. A method, comprising:
    receiving a search query at a local data collection system, the search query comprising a first query format for searching a first set of one or more indices associated with the local data collection system;
    automatically identifying, at the local data collection system, an external data collection system associated with the search query, the external data collection system not accessible via an indexer of the local data collection system and configured for searching a second set of one or more indices using a second query format different than the format of the search query;
    converting at least a portion of the search query for searching the first set of one or more indices to a second search query for searching the second set of one or more indices, the second search query being compatible with the second query format of the external data collection system, wherein the second search query cannot be used to search the first set of one or more indices, and wherein the first query format cannot be used to search the second set of one or more indices;
    sending the second search query to the external data collection system;
    in response to sending the second search query, receiving search results from the external data collection system;
    processing the received search results for display.

2. A local data collection system, comprising:
    a subsystem, implemented at least partially in hardware, that receives a search query, the search query comprising a first query format for searching a first set of one or more indices associated with the local data collection system;
    a subsystem, implemented at least partially in hardware, that automatically identifies an external data collection system associated with the search query, the external data collection system not accessible via an indexer of the local data collection system and configured for searching a second set of one or more indices using a second query format different than the format of the search query;
    a subsystem, implemented at least partially in hardware, that converts at least a portion of the search query for searching the second set of one or more indices to a second search query for searching the second set of one or more indices, the second search query being compatible with the second query format of the external data collection system;
    a subsystem, implemented at least partially in hardware, that sends the second search query to the external data collection system, wherein the second search query cannot be used to search the first set of one or more indices, and wherein the first query format cannot be used to search the second set of one or more indices;

a subsystem, implemented at least partially in hardware, that, in response to sending the second search query, receiving search results from the external data collection system;

a subsystem, implemented at least partially in hardware, that processes the received search results for display.

3. A non-transitory computer-readable medium storing one or more sequences of instructions, wherein execution of the one or more sequences of instructions by one or more processors causes the one or more processors to perform:

receiving a search query at a local data collection system, the search query comprising a first query format for searching a first set of one or more indices associated with the local data collection system;

automatically identifying an external data collection system associated with the search query, the external data collection system not accessible via an indexer of the local data collection system and configured for searching a second set of one or more indices using a second query format different than the format of the search query;

converting at least a portion of the search query for searching the first set of one or more indices to a second search query for searching the second set of one or more indices, the second search query being compatible with the second query format of the external data collection system, wherein the second search query cannot be used to search the first set of one or more indices, and wherein the first query format cannot be used to search the second set of one or more indices;

sending the second search query to the external data collection system;

in response to sending the second search query, receiving search results from the external data collection system;

processing the received search results for display.

4. The method as recited in claim 1 wherein at least a portion of the search query is fulfilled by a search head.

5. The method as recited in claim 1, further comprising:
identifying at least a second portion of the search query that is associated with the local data collection system;
sending the second portion of the search query to the local data collection system;
receiving search results from the local data collection system.

6. The method as recited in claim 1, further comprising:
identifying at least a second portion of the search query that is associated with the local data collection system;
sending the second portion of the search query to the local data collection system;
receiving search results from the local data collection system;
integrating the search results received from the external data collection system with the search results received from the local data collection system.

7. The method as recited in claim 1, further comprising:
caching the search results received from the external data collection system;
in response to receiving a third search request that contains search parameters satisfied by a particular set of cached search results, returning the particular set of cached search results.

8. The method as recited in claim 1, further comprising:
spawning a process to handle search query communications with the external data collection system.

9. The method as recited in claim 1 wherein the external data collection system comprises a Hadoop system.

10. The method as recited in claim 1 wherein the external data collection system comprises a Cassandra system.

11. The method as recited in claim 1 wherein the external data collection system comprises a MongoDB system.

12. The method as recited in claim 1 wherein the external data collection system comprises any of: a relational database management system or a structured query language system.

13. The method as recited in claim 1, wherein converting at least a portion of the search query to the second search query comprises converting a command in the search query to a second command in the second search query, the second command being compatible with the second query format of the external data collection system.

14. The method as recited in claim 1, wherein the external data collection system comprises an externally managed data collection system.

15. The apparatus as recited in claim 2 wherein at least a portion of the search query is fulfilled by a search head.

16. The apparatus as recited in claim 2, further comprising:
a subsystem, implemented at least partially in hardware, that identifies at least a second portion of the search query that is associated with the local data collection system;
a subsystem, implemented at least partially in hardware, that sends the second portion of the search query to the local data collection system;
a subsystem, implemented at least partially in hardware, that receives search results from the local data collection system.

17. The apparatus as recited in claim 2, further comprising:
a subsystem, implemented at least partially in hardware, that identifies at least a second portion of the search query that is associated with the local data collection system;
a subsystem, implemented at least partially in hardware, that sends the second portion of the search query to the local data collection system;
a subsystem, implemented at least partially in hardware, that receives search results from the local data collection system;
a subsystem, implemented at least partially in hardware, that integrates the search results received from the external collection system with the search results received from the local data collection system.

18. The apparatus as recited in claim 2, further comprising:
a subsystem, implemented at least partially in hardware, that caches the search results received from the external data collection system;
a subsystem, implemented at least partially in hardware, that, in response to receiving a third search request that contains search parameters satisfied by a particular set of cached search results, returns the particular set of cached search results.

19. The apparatus as recited in claim 2, further comprising:
a subsystem, implemented at least partially in hardware, that spawns a process to handle search query communications with the external data collection system.

20. The apparatus as recited in claim 2 wherein the external data collection system comprises a Hadoop system.

21. The apparatus as recited in claim 2 wherein the external data collection system comprises a Cassandra system.

22. The apparatus as recited in claim 2 wherein the external data collection system comprises a MongoDB system.

23. The apparatus as recited in claim 2 wherein the external data collection system comprises any of: a relational database management system or a structured query language system.

24. The non-transitory computer-readable medium as recited in claim 3 wherein at least a portion of the search query is fulfilled by a search head.

25. The non-transitory computer-readable medium as recited in claim 3, further comprising:
  identifying at least a second portion of the search query that is associated with the local data collection system;
  sending the second portion of the search query to the local data collection system;
  receiving search results from the local data collection system.

26. The non-transitory computer-readable medium as recited in claim 3, further comprising:
  identifying at least a second portion of the search query that is associated with the local data collection system;
  sending the second portion of the search query to the local data collection system;
  receiving search results from the local data collection system;
  integrating the search results received from the external data collection system with the search results received from the local data collection system.

27. The non-transitory computer-readable medium as recited in claim 3, further comprising:
  caching the search results received from the external data collection system;
  in response to receiving a third search request that contains search parameters satisfied by a particular set of cached search results, returning the particular set of cached search results.

28. The non-transitory computer-readable medium as recited in claim 3, further comprising:
  spawning a process to handle search query communications with the external data collection system.

29. The non-transitory computer-readable medium as recited in claim 3 wherein the external data collection system comprises a Hadoop system.

30. The non-transitory computer-readable medium as recited in claim 3 wherein the external data collection system comprises any of: a relational database management system or a structured query language system.

* * * * *